(12) United States Patent
Thomson (10) Patent No.: US 11,397,131 B2
(45) Date of Patent: Jul. 26, 2022

(54) BEARING DEFECT AUTO-DETECTION BY SWEPT PATTERN FOLLOWED BY POST-SWEEP LOGIC FILTER

(71) Applicant: AKTIEBOLAGET SKF, Gothenburg (SE)

(72) Inventor: Allan Thomson, Lanark (GB)

(73) Assignee: AKTIEBOLAGET SKF, Gothenburg (SE)

(*) Notice: Subject to any disclaimer, the term of this patent is extended or adjusted under 35 U.S.C. 154(b) by 171 days.

(21) Appl. No.: 16/995,997

(22) Filed: Aug. 18, 2020

(65) Prior Publication Data

US 2022/0057296 A1 Feb. 24, 2022

(51) Int. Cl.
| | | |
|---|---|---|
| *G01M 13/045* | (2019.01) | |
| *G01H 1/00* | (2006.01) | |
| *F16C 19/52* | (2006.01) | |

(52) U.S. Cl.
CPC ......... *G01M 13/045* (2013.01); *F16C 19/522* (2013.01); *F16C 19/527* (2013.01); *G01H 1/003* (2013.01)

(58) Field of Classification Search
CPC ... G01M 13/045; F16C 19/522; F16C 19/527; G01H 1/003
See application file for complete search history.

(56) References Cited

U.S. PATENT DOCUMENTS 5,365,787 A * 11/1994 Hernandez ............... G01H 1/10
73/660

* cited by examiner

*Primary Examiner* — Raul J Rios Russo
*Assistant Examiner* — Carl F. R. Tchatchouang
(74) *Attorney, Agent, or Firm* — J-Tek Law PLLC; Scott T. Wakeman; Mark A. Ussai (57) ABSTRACT

A bearing defect auto-detection system includes a processor to receive condition monitoring data that includes vibration harmonics corresponding to a bearing coupled to a rotatable shaft. The processor performs a pattern sweeping process that sweeps a pattern through both a speed range and a bearing class defect frequency range. In response to the test pattern having at test pattern sideband, the processor also sweeps the test pattern sideband through a sideband range, against the condition monitoring data to determine the pattern's fundamental frequency and sideband frequency. The processor determines a most probably bearing defect type associated with the bearing based on the best match value amongst results associated with the test pattern. The processor also performs a post-sweep logic process that compares a number (N) of most recent results from the pattern sweeping process to at least one conditional test to confirm the most probably bearing defect type is present.

24 Claims, 6 Drawing Sheets

BEARING DEFECT AUTO-DETECTION BY SWEPT PATTERN FOLLOWED BY POST-SWEEP LOGIC FILTER

BACKGROUND

A train can have many rail cars, each of which can have multiple axles and corresponding axle-boxes. Each axle-box can have installed therein bearings, whether from the same or different manufacturers. Overtime, bearings develop defects due to numerous causes (e.g., contamination, surface imperfections, lubrication issues, etc.), which can be detected within vibration harmonics of the bearings. The field of collecting and monitoring these vibration harmonics, along with addressing defects detected in these vibration harmonics, is referred to as condition monitoring.

Further, whether the conventional condition monitoring applications are on-line and off-line, installing, utilizing, and maintaining a shaft speed sensor in support of collecting and monitoring bearing vibration harmonics can be problematic and/or expensive. For example, conventional condition monitoring applications require knowledge of a shaft speed to within a few % of tolerance and the exact bearing defects (from a bearing's make and designation) to identify vibration spectrum frequency components/symptoms associated with bearing defects within the bearing vibration harmonics.

In addition, condition monitoring applications rely on known or pre-modeled bearing defect frequencies corresponding to a particular bearing make/model, which can be predetermined by the bearing manufacturer and catalogued for public availability. Accordingly, the identified vibration spectrum frequency can be compared to the predetermined bearing defect frequencies corresponding to the bearing make/model installed on the axel-box to ultimately identify one or more bearing defects. Even with knowledge of the approximate shaft speed, however, the bearing make/model actually installed on a given axel-box may differ from the expected bearing make/model designated to be installed on the axel-box, which can misdiagnose or inaccurately identify a bearing defect.

Many conventional condition monitoring applications also require managing particular parameters which can affect shaft speed calculations such as, for example, wheel diameters and bearing designations for each axle-box. A database that organizes these parameters must constantly be updated in a timely fashion to ensure the particular parameters are managed properly. The database updating process, however, can be costly with respect to man-hours, while also being prone to errors such as, for example, data indicating inaccurate bearing make/models installed on a given axel-box.

SUMMARY

According to one or more non-limiting embodiments, a method is provided to perform a bearing defect auto-detection. The method comprises receiving, by a processor from one or more sensors, condition monitoring data, the condition monitoring data including vibration harmonics of at least one bearing coupled to a rotatable shaft. The method further comprises performing a pattern sweeping process, by the processor, that sweeps at least one test pattern through both a speed range and a bearing class defect frequency range. In response to the test pattern having at least one test pattern sideband, also sweeping the at least one test pattern sideband through a sideband range, against the condition monitoring data to determine from a best match value the pattern's fundamental frequency and sideband frequency. The method further comprises determining, by the processor, a most probably bearing defect type associated with the at least one bearing based on the best match value amongst two or more results associated with the at least one test pattern. The method further comprises performing a post-sweep logic process, by the processor, that compares a number (N) of most recent results from the pattern sweeping process to at least one conditional test to confirm the most probably bearing defect type is present.

According to one or more non-limiting embodiments, a bearing defect auto-detection system is provided herein. The bearing defect auto-detection system includes a processor in signal communication with one or more sensors to receive condition monitoring data that includes vibration harmonics corresponding to at least one bearing coupled to a rotatable shaft. The processor is configured to perform a pattern sweeping process that sweeps at least one test pattern through both a speed range and a bearing class defect frequency range. In response to the test pattern having at least one test pattern sideband, the processor also sweeps the at least one test pattern sideband through a sideband range, against the condition monitoring data to determine from a best match value the pattern's fundamental frequency and sideband frequency. The processor is further configured to determine a most probably bearing defect type associated with the at least one bearing based on the best match value amongst two or more results associated with the at least one test pattern. The processor also performs a post-sweep logic process that compares a number (N) of most recent results from the pattern sweeping process to at least one conditional test to confirm the most probably bearing defect type is present.

According to one or more non-limiting embodiments, a computer program product to control to control an electronic hardware processor to perform a bearing defect auto-detection, the computer program product comprising a computer readable storage medium having program instructions embodied therewith, the program instructions executable by the processor to perform operations comprising receiving condition monitoring data, the condition monitoring data including vibration harmonics of at least one bearing coupled to a rotatable shaft. The operations further comprise performing a pattern sweeping process that sweeps at least one test pattern through both a speed range and a bearing class defect frequency range. In response to the test pattern having at least one test pattern sideband, also sweeping the at least one test pattern sideband through a sideband range, against the condition monitoring data to determine from a best match value the pattern's fundamental frequency and sideband frequency. The method further comprises determining a most probably bearing defect type associated with the at least one bearing based on the best match value amongst two or more results associated with the at least one test pattern. The method further comprises performing a post-sweep logic process that compares a number (N) of most recent results from the pattern sweeping process to at least one conditional test to confirm the most probably bearing defect type is present.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments herein relate to a swept pattern probability calculation (SPPC) for speed and defect identification within bearings. The bearing defects on the bearings and the associated machinery can include, but are not limited to, when spalls or flakes of the bearing break off (e.g., by spalling and spallation) of a bearing raceway (inner or outer) and/or roller and/or a cage thereof, as a result of brinelling, false brinelling, corrosion, contamination, lack of lubrication, or excessive rolling pressure. In accordance with one or more embodiments, an SPPC auto-detection algorithm can be implemented by one or more devices to auto-detect bearing defects on bearings and associated machinery without the need to know an exact shaft speed and the exact bearing make/model installed on a given axel-box.

For example, because bearings of railway axle-boxes and the associated machinery can provide a vibration spectrum (e.g., bearing vibration harmonics) during use, defect components/symptoms can become present in the vibration spectrum as the bearing defects develop. The SPPC auto-detection algorithm according to various non-limiting embodiments of the present teachings is capable of confirming bearing defect types without knowing the shaft speed and the exact bearing make/model installed on a given axel-box. A confirmed bearing defect type can then be utilized to determine the exact shaft speed, which can be utilized to perform further diagnostic operations and/or degradation analysis. While embodiments herein are described with respect to railway axle-boxes, the embodiments herein are not limited thereto. That is, although embodiments herein relate to deal with rail condition monitoring errors such as wheel diameter management errors required to convert global position system (GPS) linear speed to shaft rotational speed, embodiments herein are suited to many condition monitoring applications across many industries where a tachometer or speed input is not fitted or available.

Figure 1:
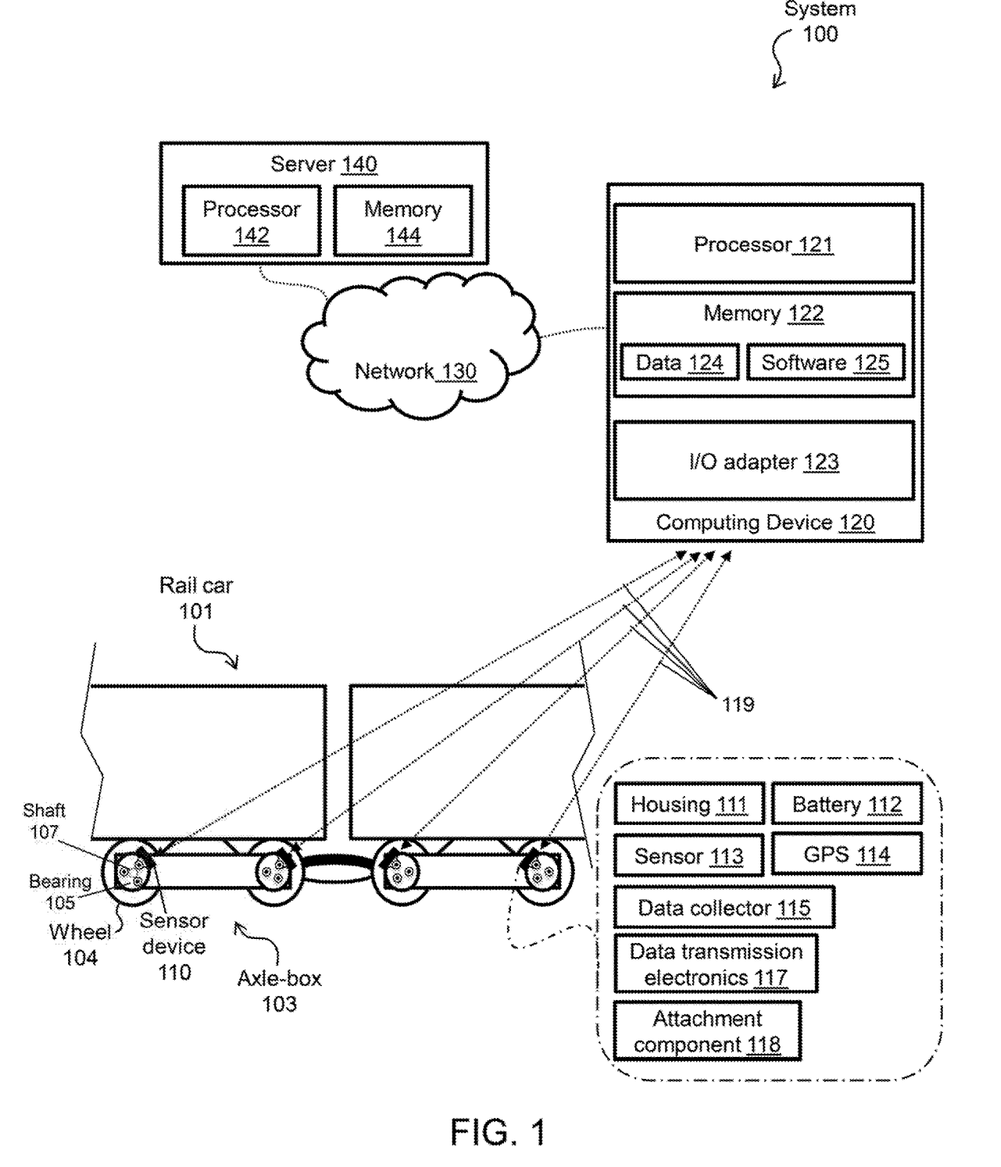
FIG. 1 depicts a system in accordance with one or more embodiments.

FIG. 1 depicts a system 100 in accordance with one or more embodiments. The system 100 includes at least one railcar 101 including at least one axle-box 103. The axle-box 103 includes one or more wheels 104 (e.g., a rail bogie wheel) attached thereto by fastening elements. Note that, while only a single axle-box is show, most railcars have two bogies hence two axles with eight wheels and eight axle-boxes attached thereto (for example, by a rail bogie wheel axle-box bearing). In general, a bearing housing of the axle-box 103 includes a rail bogie wheel axle-box bearing 105 (e.g., the bearing(s) 105) that rotatably couples a bearing 105 to a corresponding wheel 104, and a bolt configuration that attaches the bearing housing to the axle-box 103. For example, trains typically include two to an excess of seventy rail cars 101, which means thousands of bearings can be present within a system 100 including a fleet of trains.

Further, a system 100 is generally shown in accordance with one or more embodiments. The system 100 can include an electronic, computer framework comprising and/or employing any number and combination of computing device and networks utilizing various communication technologies, as described herein. The system 100 can be easily scalable, extensible, and modular, with the ability to change to different services or reconfigure some features independently of others.

The system 100 includes at least one sensor device 110 of a plurality of condition monitoring sensor devices. Each sensor device 110 is an electronic device that can include a housing 111, a battery 112, at least one sensor 113 (e.g., transducers for vibration, temperature, etc.), a data collector 115 (e.g., a processor and a memory as described herein), a GPS 114, data transmission electronics 117 (e.g., a wireless modem and/or a near field communication (NFC) transponders), and an attachment component 118 that affixes the sensor device 110 to the wheel 104 (e.g., one of the plurality of securing bolts thereof). The attachment component 118 can be any bracket, flange, or the like that attaches the sensor device 110 to a mechanical system to be monitored.

For example, each sensor device 110 can be a compact, battery-operated device (e.g., using the battery 112) that measures static and dynamic data of the bearing of the wheel 104 (e.g., condition monitoring data) to which it is attached (e.g., specifically, being attached to least one of the fastening elements of that wheel 104). Via the data transmission electronics 117, each sensor device 110 can wirelessly transmit (as represented by double arrows 119) the condition monitoring data to devices, servers, and systems, such as a computing device 120.

In accordance with one or more embodiments, the memory of the data collector 115 and/or the data transmission electronics 117 of each sensor device 110 can store the condition monitoring and/or be associated with a unique sensor identifier. For instance, an NFC transponder can be pre-programmed with a unique sensor identifier associated with a wireless modem internal to a sensor device 110 and/or can be pre-programmed with details relating to that specific sensor and mounting location (e.g., whether it is mounted on or near a rail bogie wheel axle-box bearing). Further, at various pre-defined intervals and with speed gating (e.g., such as while the railcar 101 is moving and not parked parking in a rail yard, the sensor device 110 records the condition monitoring data.

The computing device 120 includes one or more central processing units (CPU(s)) (collectively or generically referred to as an electronic hardware processor 121, or simply processor 121). The processor 121 is coupled via a system bus to a memory 122 and various other components. The memory 122 can include a read only memory (ROM) and a random access memory (RAM). The ROM is coupled to the system bus and may include a basic input/output system (BIOS), which controls certain basic functions of the computing device 120. The RAM is read-write memory coupled to the system bus for use by the processor 121. The memory 122 stores data 124 and software 125.

The data 124 includes a set of values of qualitative or quantitative variables organized in various data structures to support and be used by operations of the software 125. In accordance with one or more embodiments, the memory 122 can accumulate from the sensor devices 110 and/or store the data 124 for use by the computing device 120. In this regard, for example, the data 124 can include the condition monitoring data (e.g., vibrations and temperatures of the bearings; bearing vibration harmonics), along with speed ranges (e.g., a range from a highest expected speed to a lowest expected speed along which a shaft of the axel-box 103 can spin/rotate due to the bearings), approximated (i.e., non-exact) speed values. In one or more embodiments, the speed value is a presumed speed when the machine (e.g., rail car 101) operates within a given speed range for a threshold time (e.g., greater than 80% of the time), root sum squared (RSS) values, bearing designations, unique sensor identifiers, pre-defined intervals for data accumulation, bearing class defect frequency ranges, for each defect type to be detected. Although not indicative of a specific bearing make/model or specific bearing defect frequency, the range of bearing class defect frequencies can be pre-determined (e.g., pre-calculated) to encompass bearing defect frequencies corresponding to a class of bearing make/models. In one or more examples, the speed of a shaft can be defined as revolutions per minutes, as determined by GPS calculations that utilize approximated rail wheel diameters.

Note further that each of the one or more defect patterns can be a set of frequencies over time with respect to a class of bearing defects (e.g., as it develops), while the specific bearing type and/or specific bearing defect frequencies are unknown. In this regard, the set of frequencies correlate to defect components/symptoms that are outside healthy bearing operations. The defect test patterns can be weighted, such that a maximum match (e.g., between a frequency and a defect component/symptom) gives a highest value with respect to the others. Each defect component/symptom in a defect test pattern has maximum value of 1 but generally lower. Examples of the one or more defect test patterns can include a ball pass frequency outer (BPFO) pattern that detects an outer race defect frequency, a ball pass frequency inner (BPFI) radial and axial loadings pattern that detects an inner race defect frequency, a ball spin frequency (BSF) pattern that detects a ball bearing defect frequency, and a cage fundamental train frequency (FTF) pattern that detects a cage defect frequency. Weighting of the test patterns can be applied such that the BPFO pattern has 1×BPFO for every 5 harmonics, the BPFI radial and axial loadings pattern 1×BPFI for every 3 harmonics with 1×N sidebands, the BSF pattern has 1× or 2×BSF and few harmonics with FTF sidebands, and the cage FTF pattern has 1×FTF and a few harmonics.

The software 125 is stored as instructions for execution on the processor 121. That is, the memory 122 is also an example of a tangible storage medium readable by the processor 121, where software is stored as instructions for execution by the processor 121 to cause the system 100 to operate, such as is described herein with reference to FIGS. 2-3. Note that the software 125 can reside anywhere within many types of condition monitoring systems and can provide storage, trending, and alarming operations, when a defect is present the SPPC provides the shaft speed, defect type, and frequency for the corresponding systems condition indicator (CI) calculation. For example, in accordance with one or more embodiments, the software can include an SPPC auto-detection algorithm, as described herein. In general, the SPPC auto-detection algorithm can be implemented by the computing device 120 to auto-detect bearing defects on the bearings of the axle-box 103 (e.g., railway axle-box bearings) without the need to know accurate shaft speed, thus saving costs (e.g., man-hours) and reducing errors in managing constantly changing wheel diameters.

When the SPPC auto-detection algorithm of the software is executed, the computing device 120 sweeps several weighted test patterns through (i) a specified speed range, and (ii) a bearing class defect frequency range and calculates, for each step and for each defect test pattern type, the RSS values of the pattern-to-noise filtered spectrum correlations. The most probable defect type is identified by the test pattern which provides the largest value. In one or more non-limiting embodiments, the weightings of respective test patterns are such that when more than one test pattern crosses a set of spectral components, only one having the best match (probability) gives the highest value. In one or more non-limiting embodiments, the initial sweep can be enhanced by zeroing the spectral carpet noise and peaks not identifiably higher than the carpet by various methods.

Thereafter, from a series of last or most recent number "N" of measurements or results, a post-sweep logic is performed. In one or more embodiments, a look-up table (LUT) stored in memory can include "N" rows for each pattern, where the rows define the measurements or results. In one or more non-limiting embodiments the measurements or results include, but are not limited to, sensor RPM, pattern matching value, fundamental frequency, and sideband frequency. The post-sweep logic process includes a plurality of analyses or conditional tests to confirm that the initial most probable detected defect type is in fact the actual defect type. The conditional tests include: (i) determining that greater than N/2 of the "N" measurements are of the same defect type; (ii) of them, greater than N/2 pattern correlation values are greater than or equal to a specified threshold (e.g., 0.2 to 0.3 gE peak is typical or if in m/s^2 peak units 2 to 3); and (iii) of them, greater than N/2 of the identified fundamental and sideband frequencies correlate to the shaft RPM (as determined from GPS velocity and wheel "mid-diameter") by less error than a specified GPS % accuracy range. In one or more non-limiting embodiments, the greatest error is a constant (for within N measurements) offset due to unknown wheel diameter while the GPS/NSS system adds a random smaller error. Thus, allowing for the GPS/GNSS error the ratio within the last N measurements can vary less than the GPS/GNSS error for 80% of time. In other words, the GPS percentage (%) accuracy range can be set as 80% of measurements with less than +/−3% error. Accordingly, the system and method performed by the system as described herein provides a post-sweep logic process capable of determining for each bearing defect pattern aa first logic value, e.g., a logic "0" value negative indicating a negative or inaccurate detection, or a logic "1" value indicating a positive detection which effectively confirms that the initially most probably detected bearing type defect identified using the sweeping process is in fact an actual bearing type defect. The exact defect fundamental and sideband frequencies can also be provided for diagnosis purposes.

The computing device 120 includes one or more input/output (I/O) adapters 128 coupled to the system bus. The one or more I/O adapters 128 may include a small computer system interface (SCSI) adapter that communicates with the system memory 122 and/or any other similar component. The one or more I/O adapters 128 may include an NFC transponder that communicates with the NFC transponders of the sensor devices 110. For example, the one or more I/O adapters 128 can interconnect the system bus with a network 130, which may be an outside network, enabling the system 100 to communicate with other such systems (i.e., a server 140).

The system 100 also includes the network 130 and the server 140. The network 130 includes a set of computers connected together, sharing resources. The network 1280 can be any type of network, including a local area network (LAN), a wide area network (WAN), or the Internet, as described herein. The server 140 comprises a processor 142 and a memory 144 (as described herein) and provides various functionalities to the computing device 120, such as sharing and storing the data 124, providing processing resources, and/or performing computations (e.g., implementing the software 125).

In accordance with one or more embodiments, for example, the server 140 can be a cloud hosted condition monitoring system that executes by the processor 142 the software (e.g., the software 125 including the SPPC auto-detection algorithm) stored in the memory 144. Further, at various pre-defined intervals (e.g., such as while the railcar 101 is parking in a rail yard at the end of use), the cloud hosted condition monitoring system of the server 140 downloads and stores the data (e.g., the data 124, including the unique sensor identifiers and/or the respective condition monitoring data) from the sensor devices 110. Thus, the software of the server 140 can use the data therein to perform similar operations to the software 125 of the computing device 120.

Figure 2A:
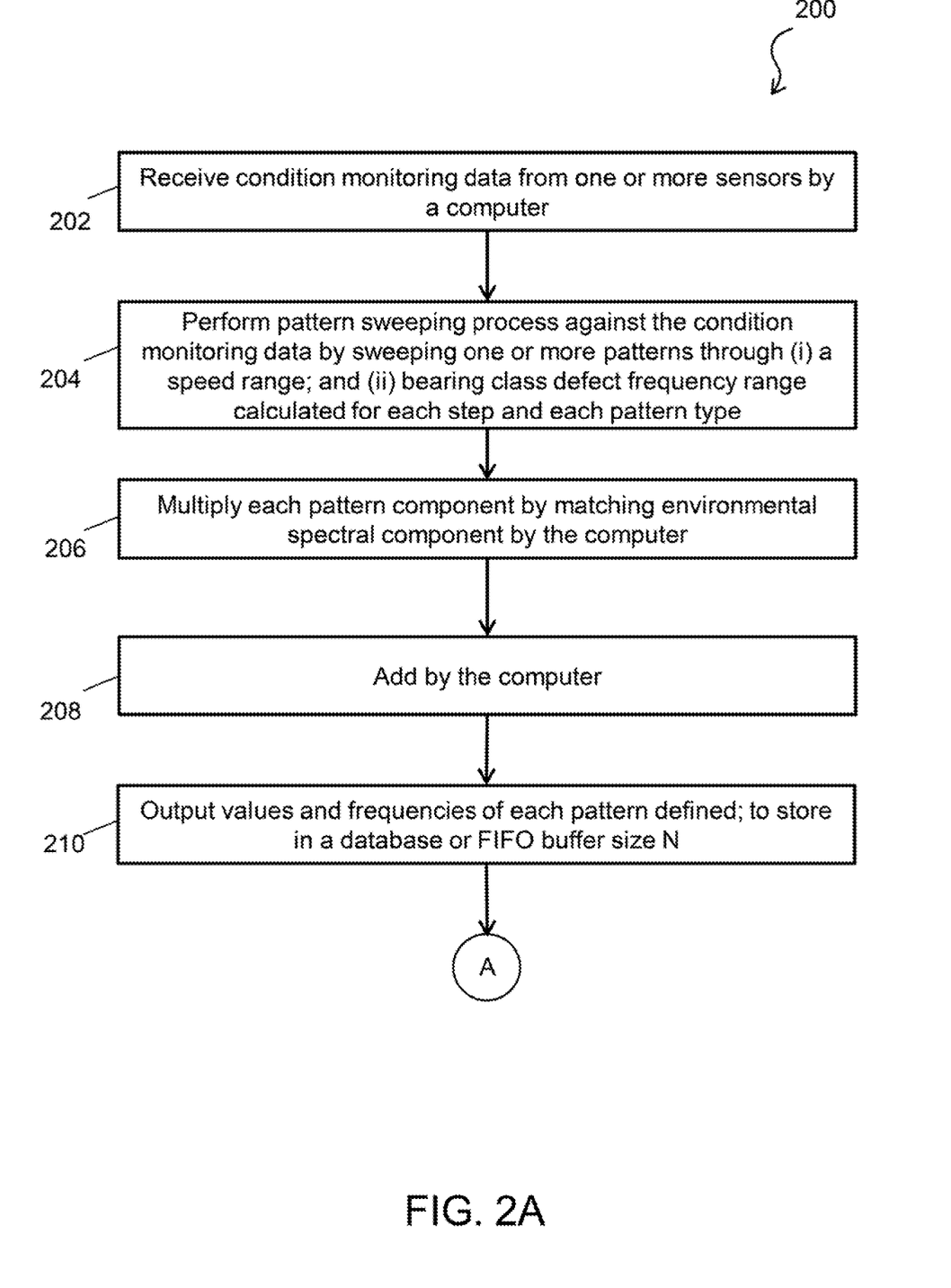
FIGS. 2A and 2B depicts a process flow in accordance with one or more embodiments.
Figure 2B:
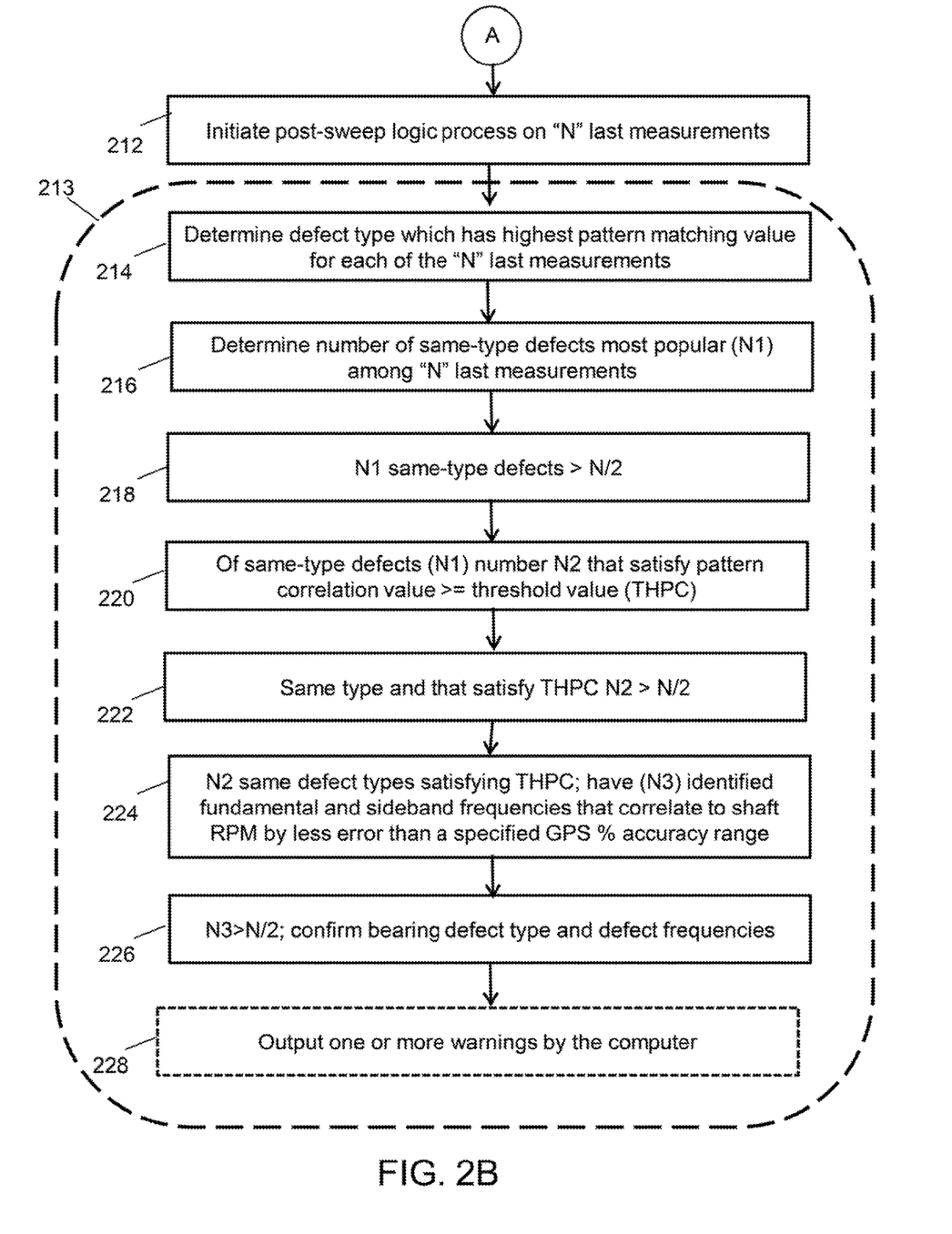

Turning now to FIGS. 2A and 2B, a process flow 200 implemented by the system 100 is depicted in accordance with one or more embodiments. The process flow 200 can be implemented by any component of the system 100. In general, with respect to the process flow 200, both the speed and the exact or specific bearing details are unknown. That is, not only is an exact shaft speed (e.g., rpm) unknown, but the exact bearing details such as, for example, the specific bearing make/model and thus the corresponding bearing defect frequencies are also unknown. The process flow 200 can be further enhanced by "zeroing" the spectral carpet noise and peaks not identifiably higher than the carpet by various methods.

The process flow 200 begins at operation 202, and a computer (e.g., the computing device 120 and/or the server 140) receives/accumulates condition monitoring data from one or more sensors (e.g., the sensors devices 110). In accordance with one or more embodiments, the condition monitoring data, along with other data described herein, can be transmitted (e.g., as represented by double arrows 119 in FIG. 1) from the sensor devices 110 to the computing device 120. More particularly, the condition monitoring data includes vibration harmonics of bearings associated with a shaft. The computing device 120 can further forward through the network 130 the condition monitoring data, along with other data described herein, to the server 140. Thus, both the computing device 120 and the server 140 accumulate sufficient information to support execution of the process flow 200. The accumulation of the condition monitoring data can occur at pre-defined intervals, and in some cases the accumulation is performed twice a day (e.g., before the railcar 101 leaves a rail yard and after it returns).

At operation 204, the computer (e.g., the computing device 120 and/or the server 140) performs a sweeping process against the condition monitoring data. The sweeping process includes sweeping one or more test patterns through (i) a speed range; and (ii) a bearing class defect frequency range calculated for each step and each defect pattern type to be detected. Although not indicative of a specific bearing make/model or specific bearing defect frequency, the range of bearing class defect frequencies can be pre-determined (e.g., pre-calculated) to encompass bearing defect frequencies corresponding to a class of bearing make/models. Accordingly, utilizing the bearing class defect frequency range can narrow the possible pattern components, along with the specific fundamental and sideband frequency ranges applicable for bearing defect diagnosis and detection. In accordance with one or more embodiments, the computing device 120 and/or the server 140 can have stored in their respective memories 122 and 144 a speed range. Although not indicative of an exact speed, this speed range can be predefined from a highest expected speed to a lowest expected speed for the condition at the time of the measurement and include a plurality of speed steps.

According to a non-limiting embodiment, the sweeping process moves the test pattern through the spectrum in several iterations, where each iteration is referred to as a "speed step. In one or more non-limiting embodiments, the step size is set at ½ a bin. Further, the computing device 120 and/or the server 140 can execute the software (e.g., the software 125) to sweep/apply these test patterns at each speed step of the speed range, which calculates RSS values of speed/pattern correlations for each speed step and each tested pattern type (e.g., by a fraction of a bin at a time of the highest frequency component). One or more bins correspond to a spectrum, such that if you have 1000 hertz spectrum with 800 lines, each bin for each line has a value of how much vibration energy is associated with a center frequency of that bin (e.g., width of 1.25 hertz).

Figure 3:
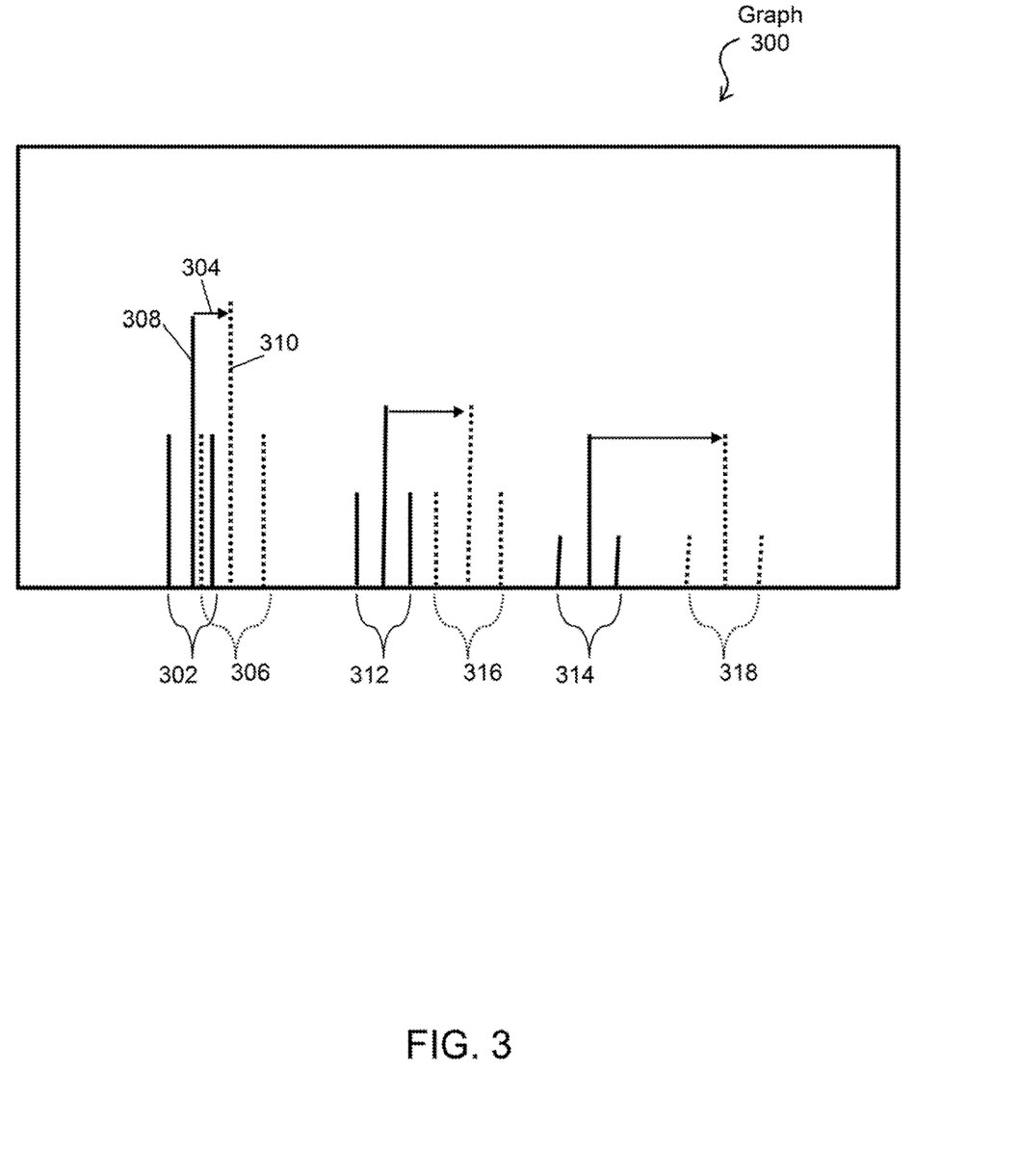
FIG. 3 depicts a graph associated with a fundamental pattern sweeping process in accordance with one or more embodiments.

Turning to FIG. 3, a graph 300 is depicted according to one or more embodiments. The graph 300 illustrates an example a pattern sweeping process of vibration harmonics 302 that are being swept 304 by a test pattern 306 of an SPPC auto-detection algorithm. The pattern sweeping process moves the test pattern through the spectrum by small increments of the fundamental frequency.

A vibration component frequency 308 is identified by a pattern component 310. In one or more embodiments, each pattern component 310 corresponds to several components defined by the number of orders (and the number of sidebands if present, either side of each order). During the fundamental sweep, the pattern components 310 become coincidental to the vibration components 308. As the pattern components 310 become coincidental to the vibration components 308, the product obtained by multiplying the RSS (root sum squared) value of the pattern component weighting values by the corresponding spectral bin values (which they are aligned to in that sweep step) reaches a maxima for that pattern. Accordingly, out of the several different types of defect patterns, the one with the largest maxima value identifies the defect type most likely to be present. As shown, the graph 300 also illustrates other examples of vibration harmonics 312 and 314 being respectively swept by pattern components 316 and 318 of an SPPC auto-detection algorithm. Note also that pattern weighting is such that if more than one pattern crosses a set of spectral components only one having the best match (probability) gives the highest value.

Figure 4:
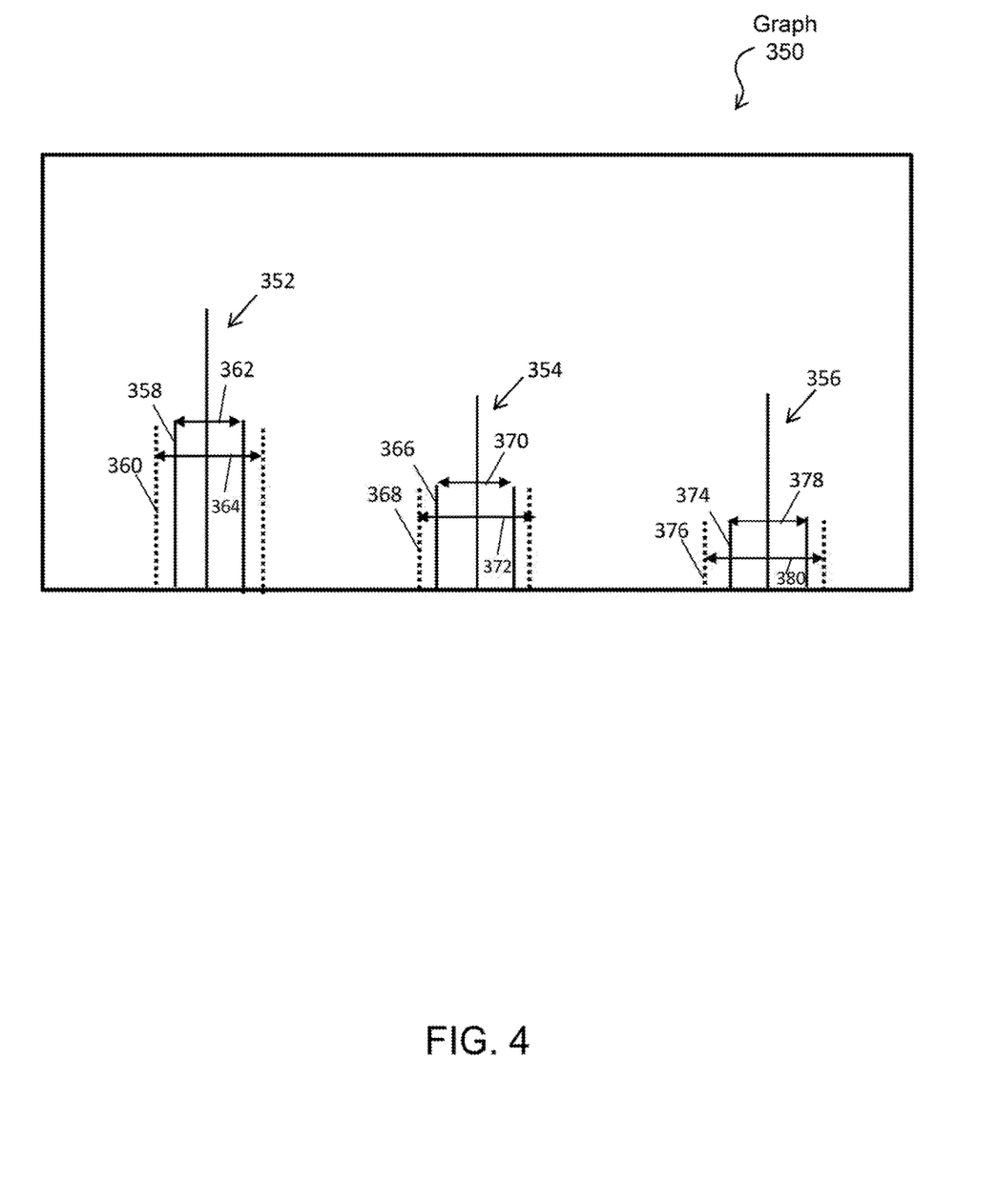
FIG. 4 depicts a graph associated with a sideband pattern sweeping process in accordance with one or more embodiments.

In some instances, the pattern sweeping process also includes performing a sideband sweeping process when the selected test pattern employed in the pattern sweeping process is known to include one or more pairs of sidebands. FIG. 4, for example, depicts a graph 350 associated with a sideband pattern sweeping process in accordance with one or more embodiments. The graph 350 depicts a first-order 352 of the fundamental signal component, a second-order 354 of the fundamental signal component, and a third-order 356 of the fundamental signal component.

The first-order 352 of the fundamental signal component includes sidebands having the same plus or minus (+/−) frequency steps as the first-order 352 of the frequency component. For simplicity, additional sets of sidebands are not shown. However, the first-order 352 of the fundamental signal component may include additional sideband without departing from the scope of the invention. The first set of sidebands associated with the first-order 352 of the fundamental signal component includes first sideband sweep range start positions 358 and first sideband sweep range end positions 360. Accordingly, the sideband pattern sweeping process includes performing a first sideband start sweep 362 (+/− frequency) and a first sideband end sweep 364 (+/− frequency).

The second-order 354 of the fundamental signal component includes sidebands having the same +/− frequency steps as the first-order 352 of the frequency component. The first set of sidebands associated with the second-order 354 of the fundamental signal component includes second sideband sweep range start positions 366 and second sideband sweep range end positions 368. Accordingly, the sideband pattern sweeping process includes performing a second sideband start sweep 370 (+/− frequency) and a second sideband end sweep 372 (+/− frequency).

The third-order 356 of the fundamental signal component includes sidebands having the same +/− frequency steps as the first-order 352 of the frequency component. The first set of sidebands associated with the third-order 356 of the fundamental signal component includes third sideband sweep range start positions 374 and third sideband sweep range end positions 376. Accordingly, the sideband pattern sweeping process includes performing a third sideband start sweep 378 (+/− frequency) and a third sideband end sweep 380 (+/− frequency).

The sideband pattern sweeping process includes performing a full sideband sweep for each increment (step) of the fundamental sweeping process described herein. The sideband sweep involves the sidebands either side of each of the fundamental orders delta-frequency (i.e., delta spacing) to range from the specific sideband's defect fundamental frequency +/− the sidebands defect range.

For the sideband sweeping process, the step size is set so that the widest sideband component is incremented, i.e., stepped. In at least one non-limiting embodiment, interpolation is not used in the pattern correlation. When not using interpolation in the pattern correlation, for example, the step size is set at ½ a bin for each sideband sweep step. Accordingly, there is no increase in frequency accuracy or amplitude accuracy by decreasing the step size below ½ bin (e.g., for the highest order in the pattern). When using interpolation in the pattern correlation, however, the step size is set at ¼ bin, or even smaller. Accordingly, both accuracies increase with smaller step sizes, but with a realized increase in processing time.

In one or more non-limiting embodiments, the sideband sweeping process is carried out as a loop within a loop of the fundamental sweeping process. For example, once the defect test pattern has been created and weighted, the number of sidebands, if any, can be determined for the defect test pattern. When a defect test pattern includes sidebands, the sweep ranges and steps are determined and the sideband sweeping process is carried out as a loop within a fundamental sweep loop performed according to the fundamental sweeping process. In one or more non-limiting embodiments, the sideband sweeping process can be omitted when the defect test pattern excludes sidebands.

Referring again to FIG. 2A, each pattern component (e.g., of the one or more defect test patterns) is multiplied by a matching environmental spectral component by the computer at operation 206. In some example embodiments, multiplying each pattern component of the one or more patterns by a matching environmental spectral component is performed using interpolated matching environmental spectral components. In other example embodiments, multiplying each pattern component of the one or more test patterns by a matching environmental spectral component is performed using quadratic peak interpolated matching environmental spectral peaks. At operation 208, the computer adds the pattern components together. In some example embodiments, the pattern components can be added together using a root sum squared (RSS). The adding generates one or more output values at operation 210. The output values include, but are not limited to, frequencies of each defined pattern. In one or more embodiments, the output values can be stored in a database or first-in-first-out FIFO memory having a buffer size of "N." Accordingly, the post-sweep logic process described herein can access the database or buffer to obtain a series of last "N" measurements indicating a most probable bearing defect type identified by the stored frequencies of each defined pattern.

Turning to operation 212 (see FIG. 2B), the computer performs a post-sweep logic process on the "N" last measurements indicative of the most probable bearing defect types. The operations included in the post-sweep logic process are indicated by dashed box 213 according to a non-limiting embodiment. At operation 214, a defect type which has the highest pattern matching value for each of the "N" last measurements is determined. At operation 216, a number of same-type defects most popular (referred to as "$N_1$") among the "N" last measurements is determined. At operation 218, the number of same-type defects (i.e., $N_1$) is determined to be greater than a target value (N/2). At operation 220, it is determined that among the same-type defects (i.e., $N_1$), a number them (referred to herein as "$N_2$") satisfy a pattern correlation value (PC) that is greater than or equal to a pattern correlation threshold value ($TH_{PC}$). At operation 222, it is determined that among the same-type defects that satisfy $TH_{PC}$ (i.e., $N_2$), a number of them (referred to herein as "$N_3$") is greater than the target value (i.e., N/2). At operation 224, the number of same-type defects that satisfy $TH_{PC}$ (i.e., $N_3$) is determined to have identified fundamental and sideband frequencies that correlate to a shaft RPM by less error than a specified GPS percentage (%) accuracy range. In one or more non-limiting embodiments, the GPS percentage (%) accuracy range is set as 80% of measurements with less than +/−3% error.

At operation 226, the most probable bearing defect type is confirmed to be the exact bearing defect type based on determining that the number of same-type defects that satisfy $TH_{PC}$ (i.e., $N_3$) is greater than the target value (i.e., N/2). In addition, the bearing defect frequencies and accurate shaft speed, i.e., the exact or actual shaft speed is confirmed at operation 226. The exact shaft is confirmed by the presence of the defect in the vibration signal and the known bearing defect ratios. At any instance of operations 218-224, when the target value is not satisfied (i.e., is not greater than N/2), or when the $TH_{PC}$ is not satisfied (i.e., $N_2$ is less than $TH_{PC}$), or when the RPM correlation is not less than the error, a warning can be generated. For example, at dashed-block 228 (e.g., optional operation), the computer outputs the one or more results. In this regard, a technician can readily ascertain concerns with any bearings being monitored by the computer and take remedial action (e.g., replace or repair the bearings). Note that if no defect components are present, it is not of importance that the speed is known. If other spectral components are present within the condition monitoring data (e.g., from the machine dynamics/mechanics), the other spectral components can also have a pattern associated therewith to calculate a speed in the absence of a bearing defect.

Figure 5:
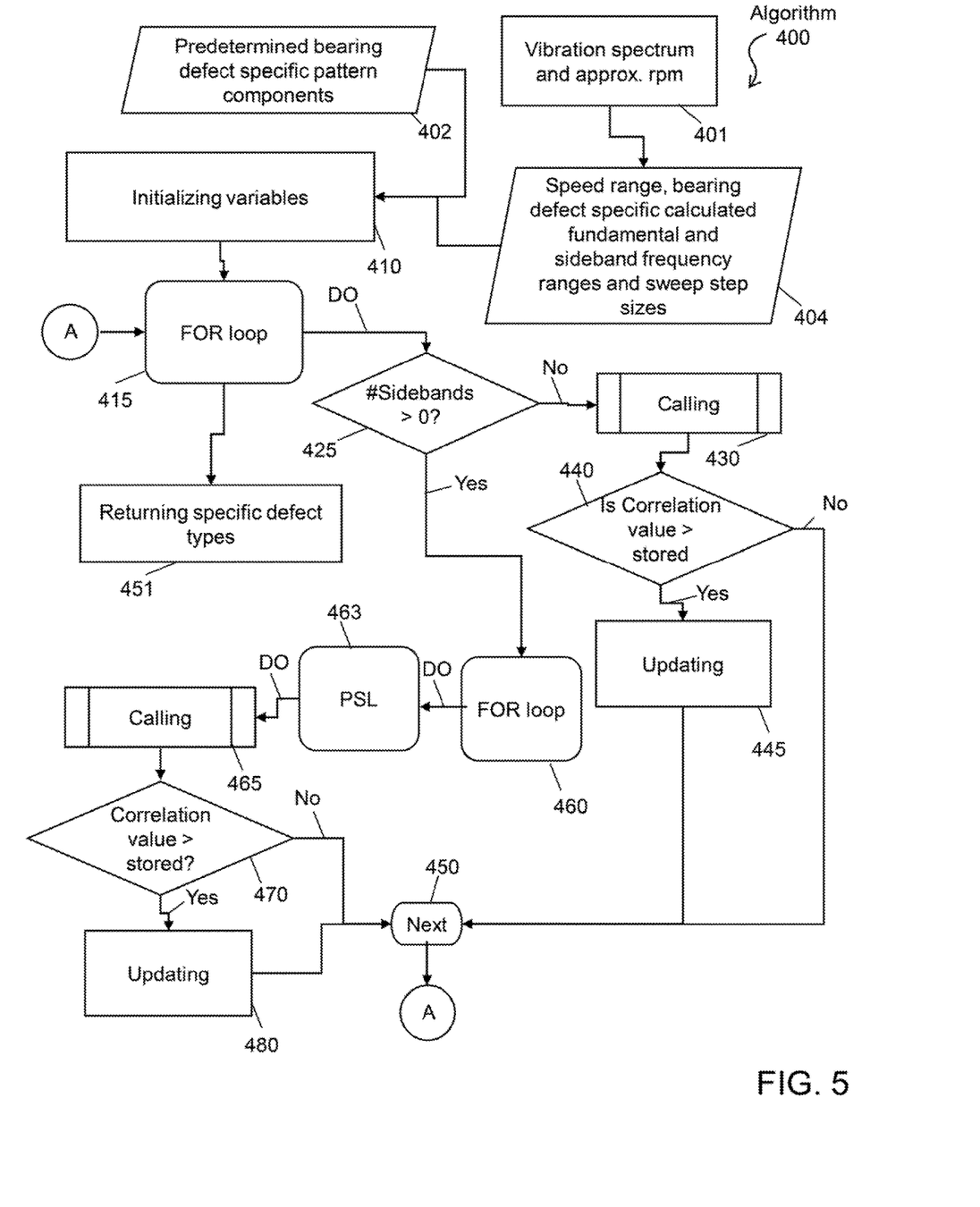
FIG. 5 depicts a flow diagram illustrating an example algorithm in accordance with one or more embodiments.

Turning now to FIG. 5, a flow diagram depicts an example algorithm 500 for performing a sideband sweeping process according to a non-limiting embodiment. The example algorithm 400 begins at blocks 402 and 404, where initial conditioning monitoring data is received. The initial conditional monitoring data includes, but is not limited to, a vibration spectrum of enveloped acceleration measurement with respect to shaft rpm (as shown in block 401), calculated speed range, sweep step sizes, and calculated bearing class defect frequency ranges for each step (as shown in block 404). Although the bearing defect specific pattern components and specific fundamental and sideband frequency ranges are unknown, a class of bearing defect frequencies can be utilized to narrow the possible pattern components, along with the specific fundamental and sideband frequency ranges applicable for bearing defect diagnosis and detection. In one or more non-limiting embodiments, when the GPS has an error range (e.g., +/−5%) and the wheel diameter has an error value (e.g., +/−5% from the stated diameter used to calculate RPM (shaft speed), then the speed range to sweep the test patterns through includes an acceptable minimum error value based, at least in part, on the GPS error range and wheel diameter error value, which in this example would be at least about +/−10%.

Then, at block 410, the example algorithm 400 initializes variables. For example, a correlation value, fundamental frequency, and a sideband frequency are each initialized to zero. At block 415, a FOR loop is entered for each vibration harmonic of a bearing. More particularly, for a fundamental range (e.g., from high to low), the example algorithm 400 steps through fundamental step sizes to sweep test patterns across the vibration harmonics. Although the sweep direction is described as being from high to low, it should be appreciated that the sweep direction can be from the low to high without departing from the scope of the invention. The FOR loop includes, at decision block 425 (as shown by the DO arrow), determining whether a number of sidebands is greater than zero. If the number of sidebands is not greater than zero, the example algorithm 400 proceeds to block 430 (e.g., following the "No" arrow).

At block 430, a correlate function is called, and at decision block 440, it is determined whether any of the correlation values are greater than stored values. If the correlation values are greater than stored values, then the example algorithm 400 proceeds to block 445 (e.g., following the "Yes" arrow) to perform an updating operation. Then, the example algorithm 400 goes to the next pattern at block 450, which returns the algorithm to the block 415. Upon returning to block 415, the example algorithm 400 returns specific defect types (e.g., for any identified correlation value, and fundamental frequency, as shown at block 451). At block 445, the correlation value and frequencies are updated. If the correlation values of the sidebands are not greater than stored values, the example algorithm 400 proceeds to block 450 (e.g., following the "No" arrow).

Returning to decision block 425, if the number of sidebands are greater than zero, the example algorithm 400 proceeds to block 460 (e.g., following the "Yes" arrow). At block 460, another FOR loop is entered for each vibration harmonic of a bearing. More particularly, for a sideband range (low to high), the example algorithm 400 steps through sideband step sizes to sweep patterns across the vibration harmonics. Following completion of the FOR loop, the method proceeds to block 463 to perform a post-sweep logic (PSL) process. The post-sweep logic process is described in detail above with respect to FIG. 2B, for example, and therefore will not be repeated for the sake of brevity.

At block 465, a correlate function is called. At decision block 470, it is determined whether any of the correlation values are greater than stored values. If the correlation values are greater than stored values, the example algorithm 400 proceeds to block 450 (e.g., following the "No" arrow). If the correlation values are greater than stored values, the example algorithm 400 proceeds to block 480 (e.g., following the "Yes" arrow). At block 480, the correlation value and frequencies are updated. Then, the example algorithm 400 proceeds to block 450.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a processor from one or more sensors, condition monitoring data, the condition monitoring data including vibration harmonics of at least one bearing coupled to a rotatable shaft;
   performing a pattern sweeping process, by the processor, that sweeps at least one test pattern through both a speed range and a bearing class defect frequency range, wherein in response to the test pattern having at least one test pattern sideband, also sweeping the at least one test pattern sideband through a sideband range, against the condition monitoring data to determine from a best match value the pattern's fundamental frequency and sideband frequency;
   determining, by the processor, a most probably bearing defect type associated with the at least one bearing based on the best match value amongst two or more results associated with the at least one test pattern; and
   performing a post-sweep logic process, by the processor, that compares a number (N) of most recent results from the pattern sweeping process to at least one conditional test to confirm the most probably bearing defect type is present.

2. The method of claim 1, wherein the condition monitoring data excludes one or both of an exact rotational speed of the shaft and a specific bearing defect frequency of the at least one bearing.

3. The method of claim 2, wherein the speed range includes a plurality of individual speed steps.

4. The method of claim 3, wherein the pattern sweeping process includes performing a plurality of fundamental sweeps on the fundamental frequency, each fundamental sweep performed for a respective speed step included in the speed range.

5. The method of claim 4, wherein the pattern sweeping process includes performing a plurality of sideband sweeps, each sideband sweep performed on the at least one set of sidebands and following each fundamental sweep performed for a given speed step.

6. The method of claim 5, wherein the at least one conditional test includes a plurality of conditional tests that are performed on a selected number of most recent results generated from the pattern sweeping process, and wherein the actual bearing defect type is confirmed in response to all of the conditional tests generating a positive result.

7. The method of claim 6, wherein at least one the conditional tests determines a positive correlation between both the fundamental frequency and the at least one set of sidebands of the fundamental frequency of the selected number of most recent results and a predicted rotational speed of the shaft.

8. The method of claim 7, wherein the positive correlation is determined in response to both the fundamental frequency and the at least one set of sidebands of the fundamental frequency of the selected number of most recent results correlating to the predicted rotational speed of the shaft by an error that is less than a speed threshold value.

9. A bearing defect auto-detection system comprising:
   a processor in signal communication with one or more sensors and configured to receive from the one or more sensors condition monitoring data that includes vibration harmonics corresponding to at least one bearing coupled to a rotatable shaft,
   wherein the processor is configured to:
      perform a pattern sweeping process that sweeps at least one test pattern through both a speed range and a bearing class defect frequency range, wherein in response to the test pattern having at least one test pattern sideband, also sweep the at least one test pattern sideband through a sideband range, against the condition monitoring data to determine from a best match value the pattern's fundamental frequency and sideband frequency;
      determine a most probably bearing defect type associated with the at least one bearing based on the best match value amongst two or more results associated with the at least one test pattern; and
      perform a post-sweep logic process that compares a number (N) of most recent results from the pattern sweeping process to at least one conditional test to confirm the most probably bearing defect type is present.

10. The bearing defect auto-detection system of claim 9, wherein the condition monitoring data excludes one or both of an exact rotational speed of the shaft and a specific bearing defect frequency of the at least one bearing.

11. The bearing defect auto-detection system of claim 10, wherein the speed range includes a plurality of individual speed steps.

12. The bearing defect auto-detection system of claim 11, wherein the pattern sweeping process includes performing a plurality of fundamental sweeps on the fundamental frequency, each fundamental sweep performed for a respective speed step included in the speed range.

13. The bearing defect auto-detection system of claim 12, wherein the pattern sweeping process includes performing a plurality of sideband sweeps, each sideband sweep performed on the at least one set of sidebands and following each fundamental sweep performed for a given speed step.

14. The bearing defect auto-detection system of claim 13, wherein the at least one conditional test includes a plurality of conditional tests that are performed on a selected number of most recent results generated from the pattern sweeping process, and wherein the actual bearing defect type is confirmed in response to all of the conditional tests generating a positive result.

15. The bearing defect auto-detection system of claim 14, wherein at least one the conditional tests determines a positive correlation between both the fundamental frequency and the at least one set of sidebands of the fundamental frequency of the selected number of most recent results and a predicted rotational speed of the shaft.

16. The bearing defect auto-detection system of claim 15, wherein the positive correlation is determined in response to both the fundamental frequency and the at least one set of sidebands of the fundamental frequency of the selected number of most recent results correlating to the predicted rotational speed of the shaft by an error that is less than a speed threshold value.

17. A computer program product to control to control an electronic hardware processor to perform a bearing defect auto-detection, the computer program product comprising a computer readable storage medium having program instructions embodied therewith, the program instructions executable by the processor to perform operations comprising:
- receiving, from one or more sensors, condition monitoring data, the condition monitoring data including vibration harmonics of at least one bearing coupled to a rotatable shaft;
- performing a pattern sweeping process that sweeps at least one test pattern through both a speed range and a bearing class defect frequency range, wherein in response to the test pattern having at least one test pattern sideband, also sweeping the at least one test pattern sideband through a sideband range, against the condition monitoring data to determine from a best match value the pattern's fundamental frequency and sideband frequency;
- determining a most probably bearing defect type associated with the at least one bearing based on the best match value amongst two or more results associated with the at least one test pattern; and
- performing a post-sweep logic process that compares a number (N) of most recent results from the pattern sweeping process to at least one conditional test to confirm the most probably bearing defect type is present.

18. The computer program product of claim 17, wherein the condition monitoring data excludes one or both of an exact rotational speed of the shaft and a specific bearing defect frequency of the at least one bearing.

19. The computer program product of claim 18, wherein the speed range includes a plurality of individual speed steps.

20. The computer program product of claim 19, wherein the pattern sweeping process includes performing a plurality of fundamental sweeps on the fundamental frequency, each fundamental sweep performed for a respective speed step included in the speed range.

21. The computer program product of claim 20, wherein the pattern sweeping process includes performing a plurality of sideband sweeps, each sideband sweep performed on the at least one set of sidebands and following each fundamental sweep performed for a given speed step.

22. The computer program product of claim 21, wherein the at least one conditional test includes a plurality of conditional tests that are performed on a selected number of most recent results generated from the pattern sweeping process, and wherein the actual bearing defect type is confirmed in response to all of the conditional tests generating a positive result.

23. The computer program product of claim 22, wherein at least one the conditional tests determines a positive correlation between both the fundamental frequency and the at least one set of sidebands of the fundamental frequency of the selected number of most recent results and a predicted rotational speed of the shaft.

24. The computer program product of claim 23, wherein the positive correlation is determined in response to both the fundamental frequency and the at least one set of sidebands of the fundamental frequency of the selected number of most recent results correlating to the predicted rotational speed of the shaft by an error that is less than a speed threshold value.

* * * * *